(12) United States Patent
Hsu et al.

(10) Patent No.: US 9,885,899 B2
(45) Date of Patent: Feb. 6, 2018

(54) DISPLAY DEVICE

(71) Applicant: Young Lighting Technology Inc., Hsin-Chu (TW)

(72) Inventors: Jeng-Bin Hsu, Hsin-Chu (TW); Chun-Chi Hsu, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 38 days.

(21) Appl. No.: 15/157,418

(22) Filed: May 18, 2016

(65) Prior Publication Data

US 2017/0038632 A1 Feb. 9, 2017

(30) Foreign Application Priority Data

Aug. 6, 2015 (CN) .......................... 2015 1 0475905

(51) Int. Cl.
*G02F 1/1333* (2006.01)
*G02F 1/1335* (2006.01)
*F21V 8/00* (2006.01)
*G06F 3/041* (2006.01)

(52) U.S. Cl.
CPC ..... *G02F 1/133308* (2013.01); *G02B 6/0055* (2013.01); *G02B 6/0088* (2013.01); *G02F 1/133528* (2013.01); *G06F 3/0412* (2013.01); *G02F 1/13338* (2013.01); *G02F 2001/133317* (2013.01); *G02F 2001/133562* (2013.01)

(58) Field of Classification Search
None
See application file for complete search history.

(56) References Cited

U.S. PATENT DOCUMENTS

| 2012/0162565 | A1* | 6/2012 | Lee, II | G02F 1/133308 |
| | | | | 349/58 |
| 2013/0044511 | A1* | 2/2013 | Motooka | G02B 6/0013 |
| | | | | 362/606 |
| 2013/0127743 | A1* | 5/2013 | Chen | G06F 3/041 |
| | | | | 345/173 |
| 2013/0293804 | A1* | 11/2013 | Kim | G02F 1/133308 |
| | | | | 349/58 |

(Continued)

FOREIGN PATENT DOCUMENTS

| CN | 202677022 | 1/2013 |
| CN | 104076547 | 10/2014 |

(Continued)

*Primary Examiner* — Ashok Patel
(74) *Attorney, Agent, or Firm* — JCIPRNET (57) ABSTRACT

A display device including a back cover, a frame, a display panel, a backlight module and a first polarizer is provided. The frame is disposed on the back cover and has an opening. The display panel is disposed in the opening and has a first surface and a second surface opposite to each other. The backlight module is disposed between the back cover and the display panel, where the first surface faces the backlight module. The first polarizer is disposed on the second surface, where a periphery of the first polarizer extends to the outside of the second surface and is carried by the frame, and the frame surrounds the periphery of the first polarizer. The display device avoids a light leakage phenomenon occurred at an edge of the display panel, achieves a full plane design at the display panel, and decreases a whole thickness.

19 Claims, 6 Drawing Sheets

(56) References Cited

U.S. PATENT DOCUMENTS

| | | | | |
|---|---|---|---|---|
| 2014/0168947 | A1* | 6/2014 | Lin | G09F 13/0413 |
| | | | | 362/97.1 |
| 2014/0293518 | A1* | 10/2014 | Park | G02B 6/0088 |
| | | | | 361/679.01 |
| 2015/0036074 | A1* | 2/2015 | Park | G02B 5/30 |
| | | | | 349/58 |
| 2016/0154172 | A1* | 6/2016 | Komano | G02B 6/0055 |
| | | | | 349/65 |

FOREIGN PATENT DOCUMENTS

| | | |
|---|---|---|
| CN | 104345492 | 2/2015 |
| CN | 104765185 | 7/2015 |
| TW | 201423216 | 6/2014 |

\* cited by examiner

DISPLAY DEVICE

CROSS-REFERENCE TO RELATED APPLICATION

This application claims the priority benefit of China application serial no. 201510475905.9, filed on Aug. 6, 2015. The entirety of the above-mentioned patent application is hereby incorporated by reference herein and made a part of this specification.

BACKGROUND OF THE INVENTION

Field of the Invention

The invention relates to a display device, and particularly relates to a display device having a backlight module.

Description of Related Art

Along with quick development of the semiconductor industry and related electronics industry, digital display devices such as smart phones, notebooks, tablet PCs, flat-screen TVs are all developed towards a trend of more convenience, multi-function and good-looking. When these products are used, a display screen is an indispensable display interface, and a liquid crystal display (LCD) device has become a main stream of the display screens. Since a LCD panel of the LCD device is not luminous itself, a backlight module has to be configured under the LCD panel for providing light beams required for displaying images.

Generally, a cover glass is configured to cover the LCD panel of the LCD device to protect the LCD panel, and touch sensors are configured on the cover glass to provide a touch function, or a plug-in touch panel is overlapped to the LCD panel to provide the touch function. However, the aforementioned LCD device is unable to reach the current trend of thickness reduction due to configuration of the cover glass or the plug-in touch panel.

In order to decrease the thickness of the LCD device, in some LCD devices, a built-in touch panel is configured to provide the touch function, where the built-in touch panel can be an in-cell touch panel and an on-cell touch panel according to a configuration position of the touch sensors. The in-cell refers to that the touch sensors are configured in a liquid crystal layer between two cell glasses of the LCD panel, and the on-cell refers to that the touch sensors are configured on a surface of the cell glass of the LCD panel. However, when the cover glass is omitted to further decrease the thickness of the LCD device, the configuration method of omitting the cover glass is liable to result in a fact that the light beam emitted by the backlight module produces a light leakage phenomenon at the edge of the LCD panel, which decreases a display quality of the LCD panel. In order to mitigate the aforementioned light leakage phenomenon, in some LCD devices, a case is configured to cover the edge of the LCD panel to prevent the light leakage. However, based on the above solution, the LCD device is unable to reach a full plane design at the LCD panel.

The information disclosed in this "BACKGROUND OF THE INVENTION" section is only for enhancement of understanding of the background of the described technology, and therefore it may contain information that does not form the prior art that is already known to a person of ordinary skill in the art. Further, the information disclosed in the "BACKGROUND OF THE INVENTION" section does not mean that one or more problems to be resolved by one or more embodiments of the invention was acknowledged by a person of ordinary skill in the art.

SUMMARY OF THE INVENTION

The invention is directed to a display device, which avoids a light leakage phenomenon produced at an edge of a display panel, and is able to reach a full plane design at the display panel, and a whole thickness thereof is decreased.

Other objects and advantages of the invention can be further illustrated by the technical features broadly embodied and described as follows.

In order to achieve one or a portion of or all of the objects or other objects, an embodiment of the invention provides a display device including a back cover, a frame, a display panel, a backlight module and a first polarizer. The frame is disposed on the back cover and has an opening. The display panel is disposed in the opening and has a first surface and a second surface opposite to each other. The backlight module is disposed between the back cover and the display panel, where the first surface faces the backlight module. The first polarizer is disposed on the second surface, where a periphery of the first polarizer extends to the outside of the second surface and is carried by the frame, and the frame surrounds the periphery of the first polarizer.

According to the above descriptions, the embodiments of the invention have at least one of the following advantages and effects. In the display device of the invention, the first polarizer extends from the display panel to the frame and is carried by the frame, such that the edge of the display panel is covered by the first polarizer. In this way, when the light beam emitted by the backlight module is propagated to the edge of the display panel, the first polarizer may prevent the light beam from propagating to external, so as to avoid the light leakage phenomenon occurred at the edge of the display panel. Moreover, the frame of the invention surrounds the periphery of the first polarizer to protect the periphery of the first polarizer, so as to decrease a chance of damaging the first polarizer due to an external force. In addition, since the existing first polarizer on the display panel is used for covering the edge of the display panel other than using the case or the frame of the display device to cover the edge of the display panel, it is avoided to spoil the full plane design of the display device at the display panel by the case or the frame. Moreover, since the display device of the invention omits the conventional cover glass, a whole thickness of the display device is decreased, so as to achieve a thinning effect.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
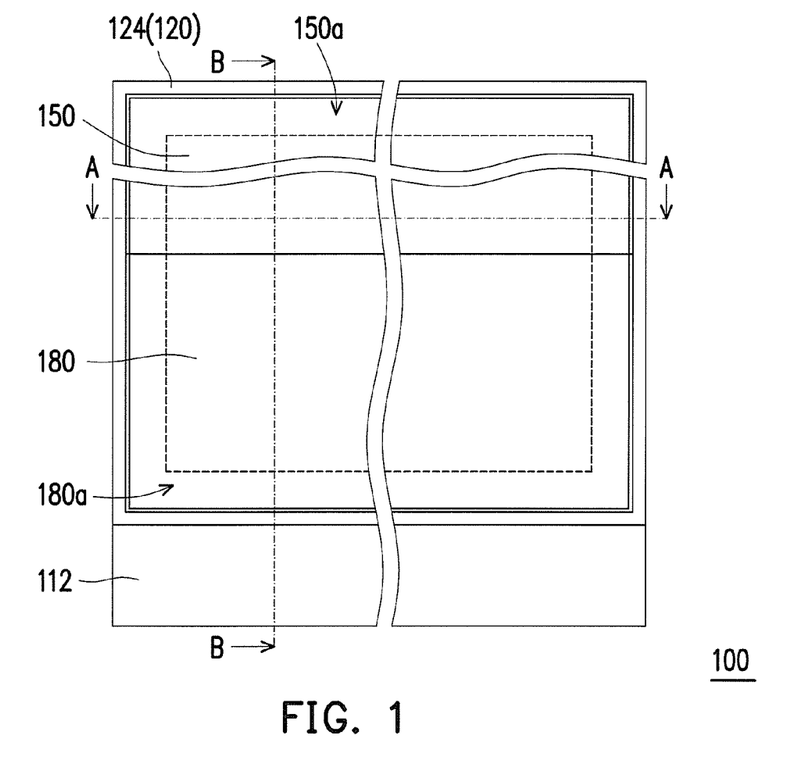
FIG. 1 is a schematic diagram of a display device according to an embodiment of the invention.
Figure 2:
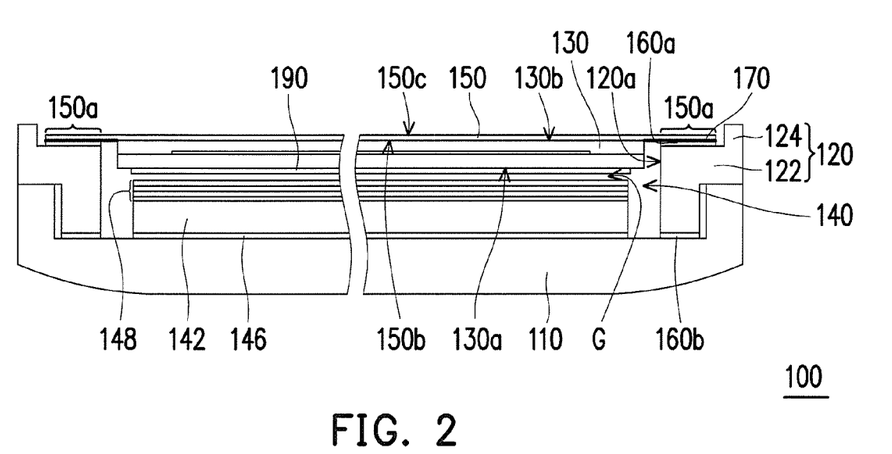
FIG. 2 is a cross-sectional view of the display device of FIG. 1 viewing along an A-A line.
Figure 3:
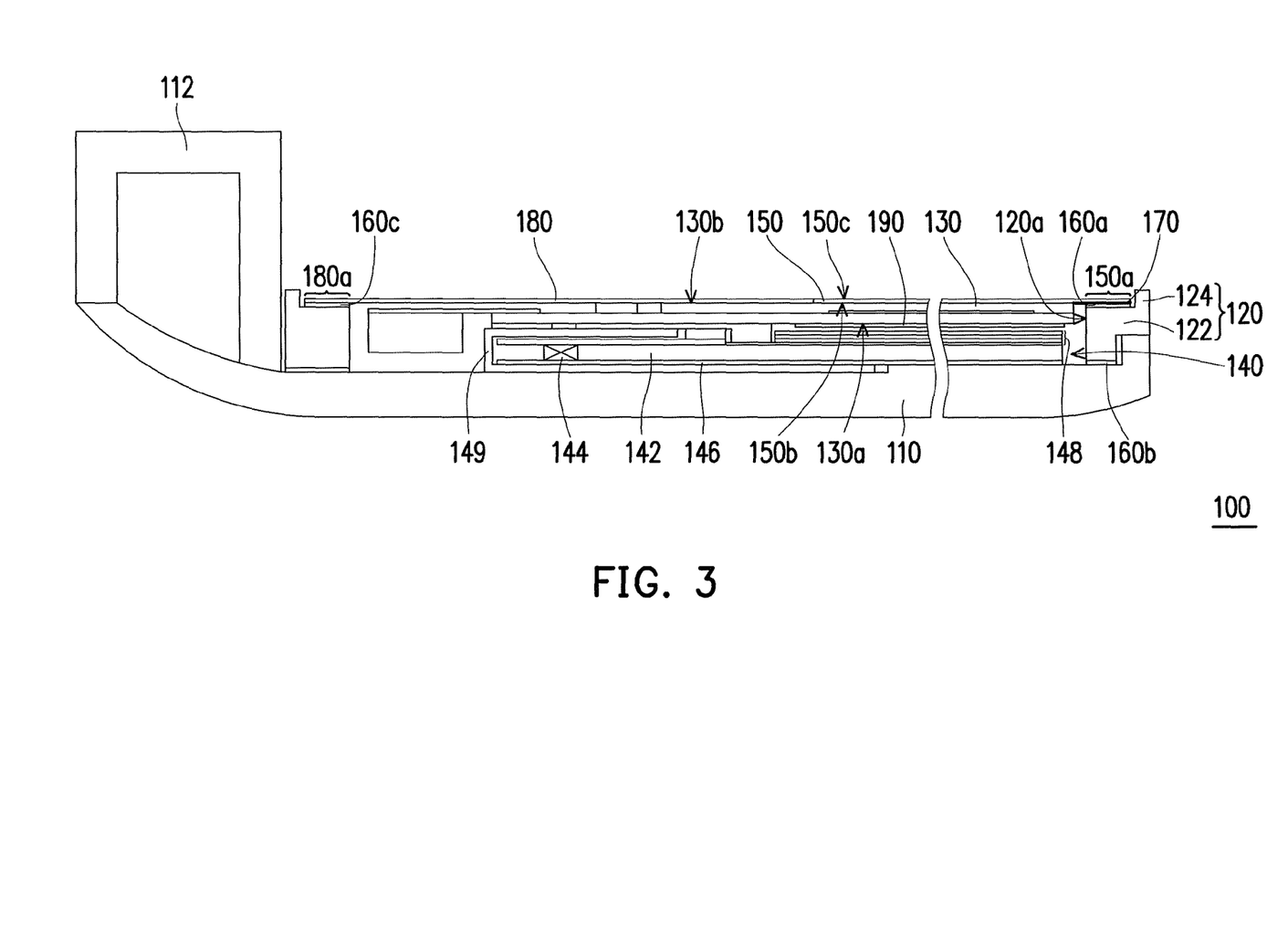
FIG. 3 is a cross-sectional view of the display device of FIG. 1 viewing along a B-B line.

FIG. 1 is a schematic diagram of a display device according to an embodiment of the invention. FIG. 2 is a cross-sectional view of the display device of FIG. 1 viewing along an A-A line. FIG. 3 is a cross-sectional view of the display device of FIG. 1 viewing along a B-B line. Referring to FIG. 1 to FIG. 3, the display device 100 of the embodiment includes a back cover 110, a frame 120, a display panel 130 and a backlight module 140. The display device 100 is, for example, a display screen of a notebook computer, and a pivot cover 112 (shown in FIG. 1 and FIG. 3) are configured on the back cover 110, where the pivot cover 112 is configured to cover a pivot between the display screen and a corresponding host (not shown). In other embodiments, the display device 100 can be a display screen of other suitable electronic apparatus, for example, a smart phone, a tablet PC or a flat panel TV, which is not limited by the invention.

The frame 120 is disposed on the back cover 110 and has an opening 120a, where the back cover 110 and the frame 120 are exterior parts of the display device 100. The display panel 130 is disposed in the opening 120a and has a first surface 130a and a second surface 130b opposite to each other. The backlight module 140 is disposed in the opening 120a of the frame 120 and is located between the back cover 110 and the display panel 130, and the first surface 130a of the display panel 130 faces the backlight module 140. In the embodiment, the display panel 130 is, for example, but not limited to a liquid crystal display (LCD) panel, and is, for example, but not limited to an in-cell touch display panel having a touch function.

The display device 100 further includes a first polarizer 150 and a second polarizer 190. The first polarizer 150 is disposed on the second surface 130b of the display panel 130, and the second polarizer 190 is disposed on the first surface 130a of the display panel 130, where a periphery 150a of the first polarizer 150 extends to the outside of the second surface 130b of the display panel 130 and is carried by the frame 120, and the frame 120 surrounds the periphery 150a of the first polarizer 150. In detail, the periphery 150a is located outside dot lines of the first polarizer 150 of FIG. 1, and is located in a U-shape region between the dot lines and the frame 120. The frame 120 includes a carrier portion 122 and a buffer portion 124, the carrier portion 122 carries the periphery 150a of the first polarizer 150, and the buffer portion 124 is connected to the carrier portion 122 and surrounds the periphery 150a of the first polarizer 150.

Under the above configuration, the first polarizer 150 extends to the frame 120 from the display panel 130 and is carried by the frame 120, such that an edge of the display panel 130 is covered by the first polarizer 150. In this way, when the light beam (not shown) emitted by the backlight module 140 is propagated to the edge of the display panel 130, the first polarizer 150 may prevent the light beam from propagating to external, so as to avoid the light leakage phenomenon occurred at the edge of the display panel 130. Moreover, the frame 120 of the embodiment surrounds the periphery 150a of the first polarizer 150 to protect the periphery 150a of the first polarizer 150, so as to decrease a chance of damaging the first polarizer 150 due to an external force.

In the embodiment, since the existing first polarizer 150 on the display panel 130 is used for covering the edge of the display panel 130 other than using a case or a frame of the display device 100 to cover the edge of the display panel 130, it is avoided to spoil a full plane design of the display device 100 at the display panel 130 by the case or the frame. In detail, the first polarizer 150 of the embodiment has a third surface 150b and a fourth surface 150c opposite to each other, where the third surface 150b faces the display panel 130 and the frame 120, and the fourth surface 150c faces the outside of the display device 100, and the buffer portion 124 of the frame 120 completely exposes the fourth surface 150c of the first polarizer 150, i.e. the fourth surface 150c of the first polarizer 150 is not covered by the buffer portion 124 of the frame 120, such that the display device 100 achieves the full plane design through the fourth surface 150c of the first polarizer 150. Moreover, the display device 100 omits the conventional cover glass, so as to decrease a whole thickness thereof to achieve a thinning effect.

Referring to FIG. 3, in the embodiment, the display device 100 further includes a cover 180, where the first polarizer 150 covers a part of the second surface 130*b* of the display panel 130, and the cover 180 covers another part of the second surface 130*b* of the display panel 130. Similar to the situation that the periphery 150*a* of the first polarizer 150 extends to the outside of the second surface 130*b* and is carried and surrounded by the frame 120, a periphery 180*a* of the cover 180 also extends to the outside of the second surface 130*b* and is carried and surrounded by the frame 120. In detail, the periphery 180*a* is located outside the dot lines of the cover 180 of FIG. 1, and is located in an inverted U-shape region between the dot lines and the frame 120. The periphery 180*a* of the cover 180 and the periphery 150*a* of the first polarizer 150 construct a rectangular ring-shape region. The first polarizer 150 is connected to the cover 180 as shown in FIG. 3 and is coplanar with the cover 180, such that the full plane design can be more complete. Moreover, cover 180 is an exterior part, and is, for example, an opaque part for covering the internal components of the display device 100 to prevent the user from seeing through, so as to achieve a good-looking effect. The internal components are, for example, but not limited to a circuit board, wires or a display panel driving IC.

Referring to FIG. 2 and FIG. 3, the display device 100 of the embodiment further includes a light-shielding layer 170. The light-shielding layer 170 is disposed between the periphery 150*a* of the first polarizer 150 and the carrier portion 122 of the frame 120 and extends towards the display panel 130, so as to effectively shield the light beam propagated to the edge of the display panel 130 from the backlight module 140. The light-shielding layer 170 is, for example, a black light-shielding coating, though the invention is not limited thereto.

In the embodiment, a material of the frame 120 is different from a material of the back cover 110, and the frame 120 and the back plate 110 are not integrally formed. Further, a material of the buffer portion 124 of the frame 120 is, for example, an elastic material (for example, plastic or rubber), so as to provide a buffer effect around the display panel 130 and the first polarizer 150, and the buffer portion 124 of the frame 120, for example, protrudes out of the fourth surface 150*c* of the first polarizer 150, so as to avoid an excessive impact force generated between the display device 100 and other structure (for example, the host of the notebook computer). The first polarizer 150 is, for example, fixed to the frame 120 through adhesion by using an adhesive layer 160*a*, the frame 120 is, for example, fixed to the back cover 110 through adhesion by using an adhesive layer 160*b*, and the cover 180 is, for example, fixed to the frame 120 through adhesion by using an adhesive layer 160*c*. In other embodiments, the first polarizer 150, the frame 120, the back cover 110 and the cover 180 can be fixed to each other through other suitable manner, which is not limited by the invention.

In the embodiment, the display panel 130 is combined with the first polarizer 150, and the periphery 150*a* of the first polarizer 150 is carried by the frame 120, such that the display panel 130 is indirectly carried by the frame 120 through the first polarizer 150. Under such configuration, the display panel 130 is unnecessary to be carried by the backlight module 140, so that the display panel 130 and the backlight module 140 have a gap G therebetween, as shown in FIG. 2, i.e. the display panel 130 is separated from the backlight module 140.

Referring to FIG. 2 and FIG. 3, the backlight module 140 of the embodiment is, for example, side-type backlight module and includes a light guide plate 142, a light source 144, a reflector 146, an optical film set 148 and a lampshade 149. The light source 144 is, for example, a light-emitting diode (LED) light source and is disposed beside a light incident surface of the light guide plate 142, the reflector 146 and the optical film set 148 are respectively disposed on two opposite surfaces (for example, a bottom surface and a light emitting surface) of the light guide plate 142, and the lampshade 149 is used for covering the light source 144. In other embodiments, the backlight module 140 can be other suitable light source device, which is not limited by the invention.

Figure 4:
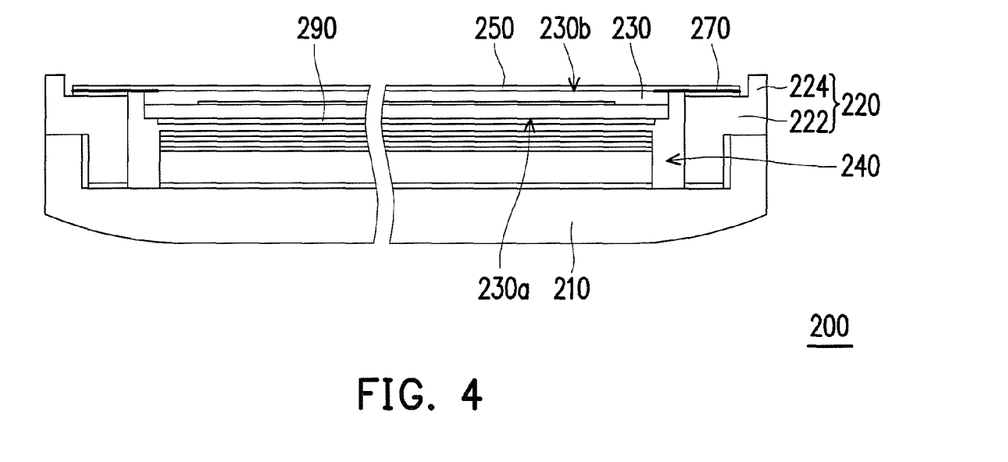
FIG. 4 is a cross-sectional view of a display device according to another embodiment of the invention.

FIG. 4 is a cross-sectional view of a display device according to another embodiment of the invention. In the display device 200 of FIG. 4, configurations of a back cover 210, a frame 220, a carrier portion 222, a buffer portion 224, a display panel 230, a first surface 230*a*, a second surface 230*b*, a backlight module 240, a first polarizer 250 and a second polarizer 290 are similar to the configurations of the back cover 110, the frame 120, the carrier portion 122, the buffer portion 124, the display panel 130, the first surface 130*a*, the second surface 130*b*, the backlight module 140, the first polarizer 150 and the second polarizer 190 of FIG. 2, and details thereof are not repeated. A difference between the display device 200 and the display device 100 is that the light-shielding layer 270 extends to a place between the first polarizer 250 and the second surface 230*b* of the display panel 230, so as to truly shield the light beam propagated to the edge of the display panel 230 from the backlight module 240.

Figure 5:
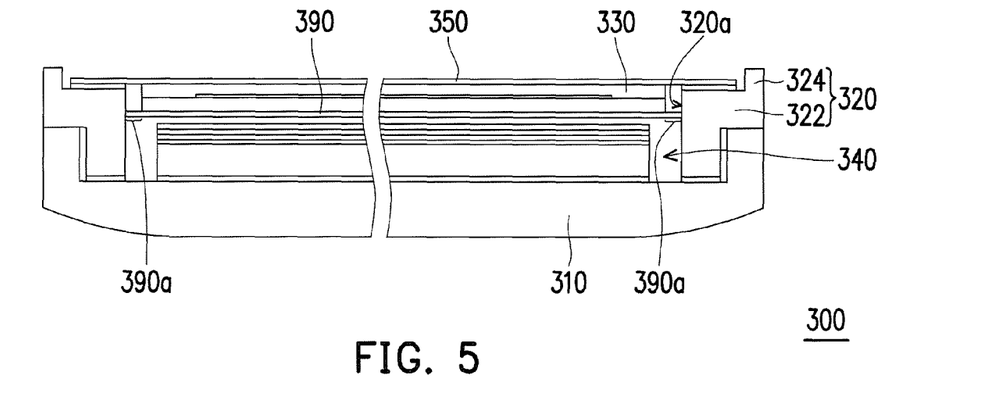
FIG. 5 is a cross-sectional view of a display device according to another embodiment of the invention.

FIG. 5 is a cross-sectional view of a display device according to another embodiment of the invention. In the display device 300 of FIG. 5, configurations of a back cover 310, a frame 320, a carrier portion 322, a buffer portion 324, a display panel 330, a backlight module 340, a first polarizer 350 and a second polarizer 390 are similar to the configurations of the back cover 110, the frame 120, the carrier portion 122, the buffer portion 124, the display panel 130, the backlight module 140, the first polarizer 150 and the second polarizer 190 of FIG. 2, and details thereof are not repeated. A difference between the display device 300 and the display device 100 is that a periphery 390*a* of the second polarizer 390 extends to an inner edge of an opening 320*a* of the frame 320, such that the second polarizer 390 may truly shield the light beam propagated to the edge of the display panel 330 from the backlight module 340. A transmission axis direction of the first polarizer 350 is different from a transmission axis direction of the second polarizer 390, such that the first polarizer 350 and the second polarizer 390 may cooperate to effectively shield the light beam.

Figure 6:
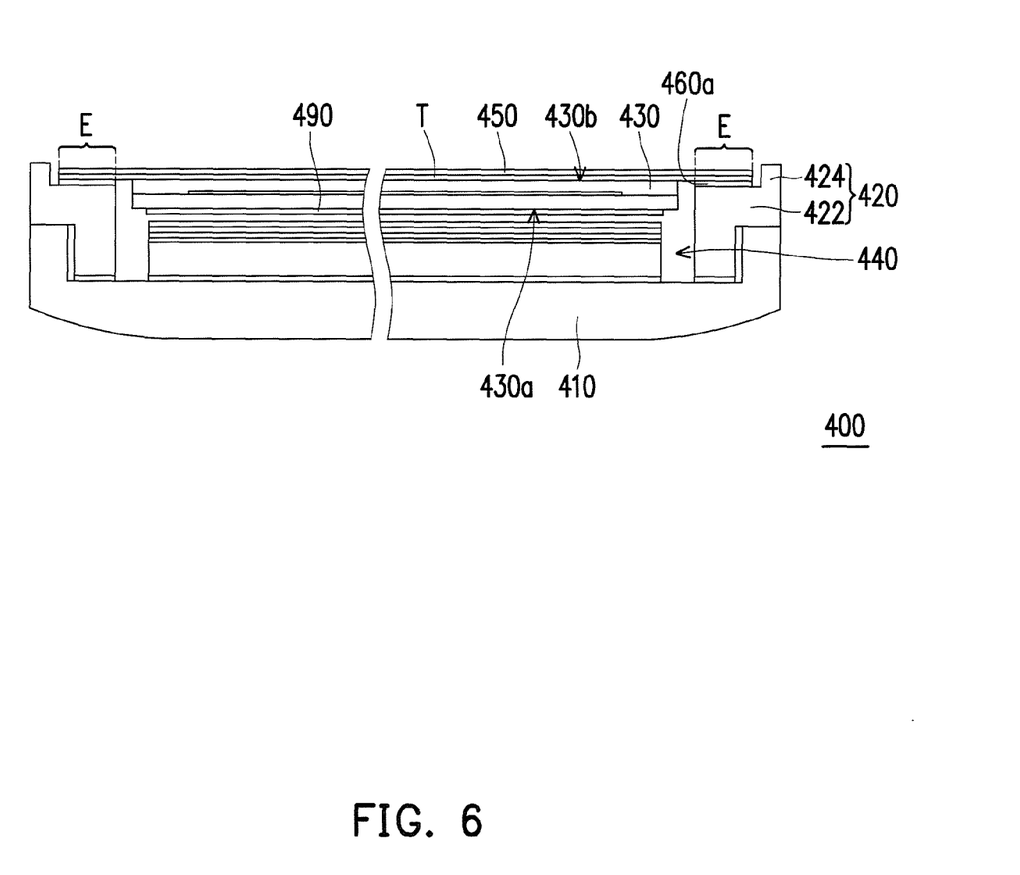
FIG. 6 is a cross-sectional view of a display device according to another embodiment of the invention.
Figure 7:
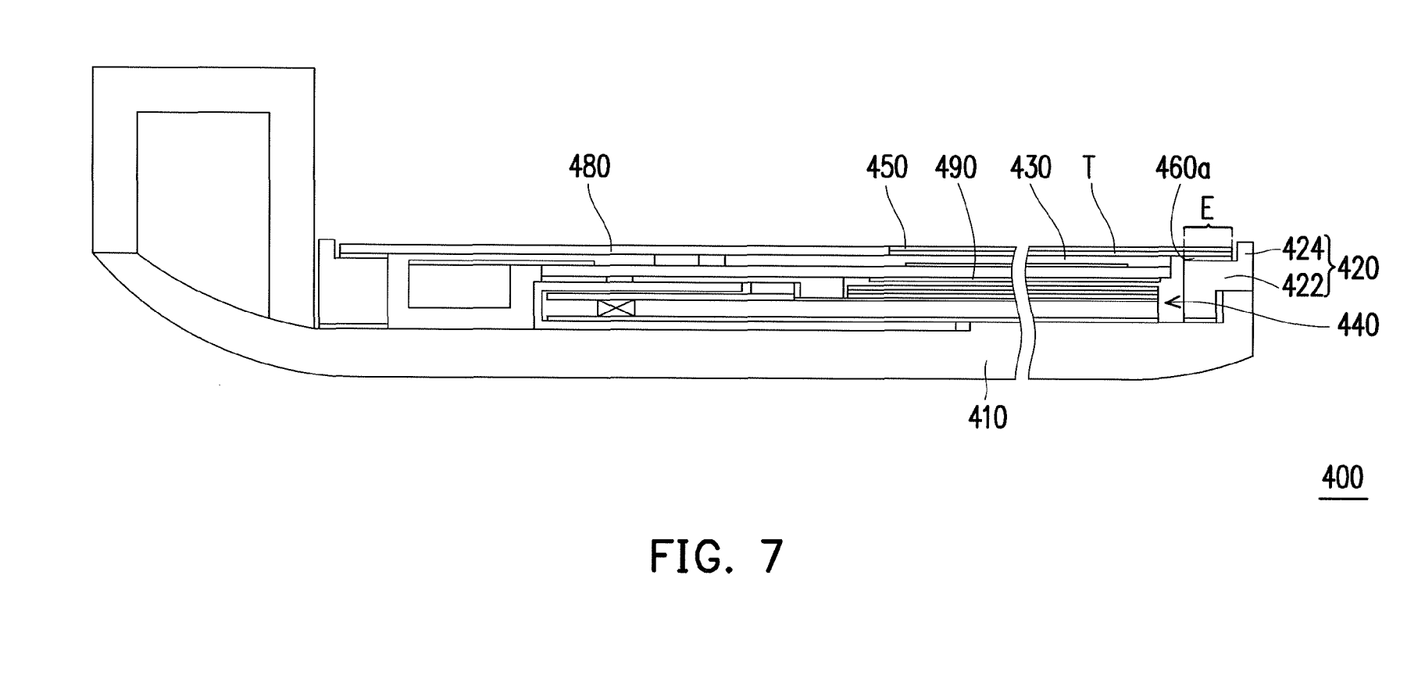
FIG. 7 is a cross-sectional view of the display device of FIG. 6 in another cross-section.

FIG. 6 is a cross-sectional view of a display device according to another embodiment of the invention. FIG. 7 is a cross-sectional view of the display device of FIG. 6 in another cross-section. In the display device 400 of FIG. 6 and FIG. 7, configurations of a back cover 410, a frame 420, a carrier portion 422, a buffer portion 424, a display panel 430, a first surface 430*a*, a second surface 430*b*, a backlight module 440, a first polarizer 450, a second polarizer 490 and a cover 480 are similar to the configurations of the back cover 110, the frame 120, the carrier portion 122, the buffer portion 124, the display panel 130, the first surface 130*a*, the second surface 130*b*, the backlight module 140, the first polarizer 150, the second polarizer 190 and the cover 180 of FIG. 3, and details thereof are not repeated. A difference between the display device 400 and the display device 100 is that the display device 400 further includes a touch layer T, where the touch layer T is disposed between the first polarizer 450 and the display panel 430, such that the display panel 430 and the touch layer T commonly construct an on-cell touch display panel. A periphery E of the touch layer T extends to the outside of the second surface 430b of the display panel 430 and is carried by the carrier portion 422 of the frame 420, such that the periphery E of the touch layer T shields the light beam propagated to the edge of the display panel 430 from the backlight module 440. The buffer portion 424 of the frame 420 surrounds the periphery E of the touch layer T, so as to achieve an effect of protecting the periphery E of the touch layer T. In the embodiment, the periphery E of the touch layer T is, for example, adhered to the frame 420 through an adhesive layer 460a.

Figure 8:
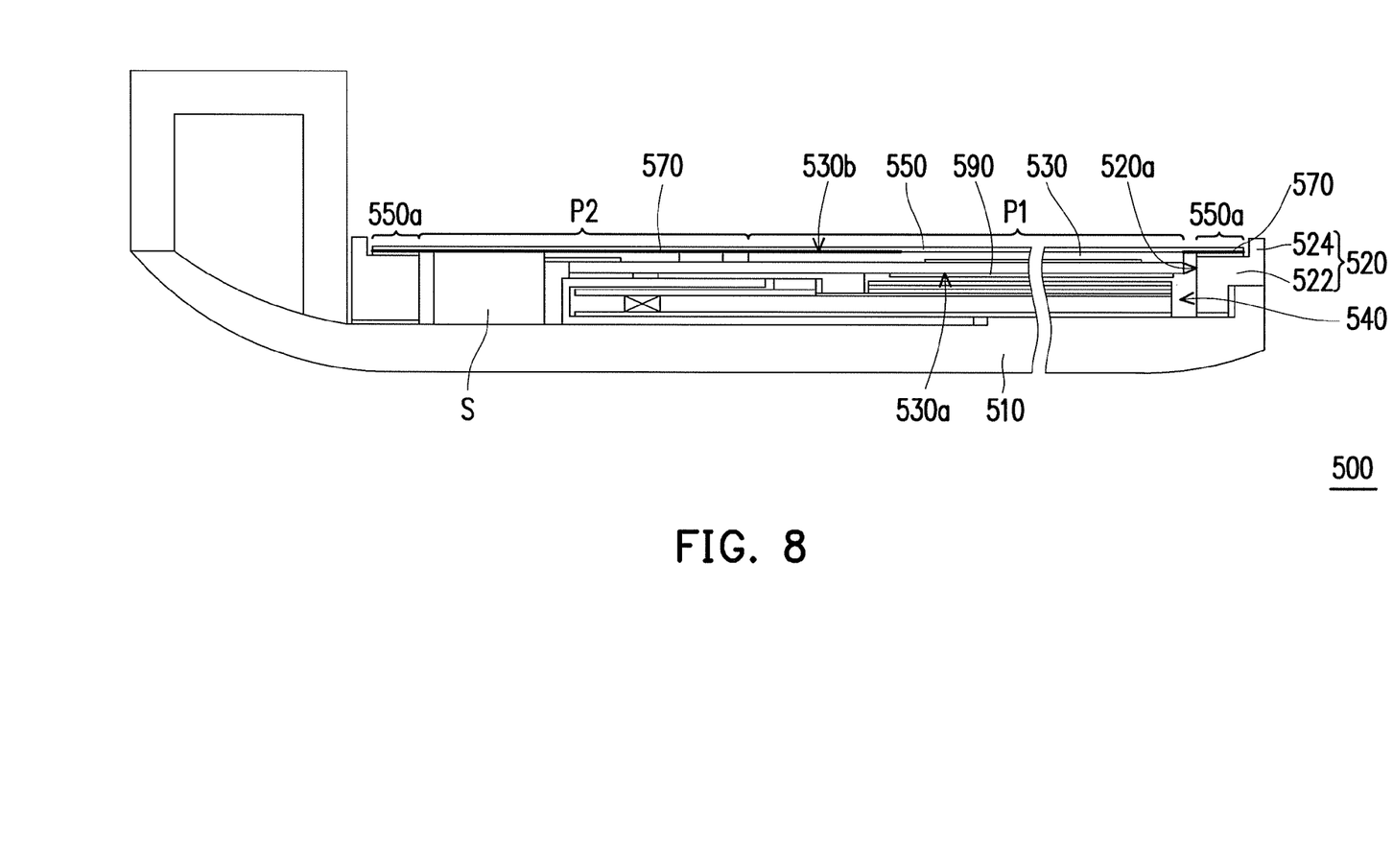
FIG. 8 is a cross-sectional view of a display device according to another embodiment of the invention.

FIG. 8 is a cross-sectional view of a display device according to another embodiment of the invention. In the display device 500 of FIG. 8, configurations of a back cover 510, a frame 520, a carrier portion 522, a buffer portion 524, a display panel 530, a first surface 530a, a second surface 530b, a backlight module 540, a first polarizer 550 and a second polarizer 590 are similar to the configurations of the back cover 110, the frame 120, the carrier portion 122, the buffer portion 124, the display panel 130, the first surface 130a, the second surface 130b, the backlight module 140, the first polarizer 150 and the second polarizer 190 of FIG. 3, and details thereof are not repeated. A difference between the display device 500 and the display device 100 is that the display device 500 does not have the cover 180 shown in FIG. 3, and a size of the first polarizer 550 of the display device 500 is greater than a size of the first polarizer 150 of the display device 100, so as to cover a coverage range of the cover 180 of FIG. 3. In detail, a part P1 of the first polarizer 550 covers the second surface 530b of the display panel 530, and another part P2 of the first polarizer 550 is located outside the second surface 530b to cover other internal components of the display device 500. A light-shielding layer 570 located to the left is disposed between a periphery 550a of the first polarizer 550 and the carrier portion 522 of the frame 520 and extends towards the display panel 530, and extends to a place between the first polarizer 550 and the second surface 530b of the display panel 530, and covers a part of the second surface 530b, such that the other internal components of the display device 500 cannot be viewed by the user, so as to achieve the good-looking effect. Moreover, the display device 500 further includes a supporting member S, where the supporting member S is disposed in the opening 520a of the frame 520 and located between the display panel 530 and the frame 520, the part P2 of the first polarizer 550 is supported by the supporting member S, so as to avoid unexpected bending of the first polarizer 550 at the part P2.

In summary, the embodiments of the invention have at least one of the following advantages and effects. In the display device of the invention, the first polarizer extends from the display panel to the frame and is carried by the frame, such that the edge of the display panel is covered by the first polarizer. In this way, when the light beam emitted by the backlight module is propagated to the edge of the display panel, the first polarizer may prevent the light beam from propagating to external, so as to avoid the light leakage phenomenon occurred at the edge of the display panel. Moreover, the frame of the invention surrounds the periphery of the first polarizer to protect the periphery of the first polarizer, so as to decrease a chance of damaging the first polarizer due to an external force. In addition, since the existing first polarizer on the display panel is used for covering the edge of the display panel other than using the case or the frame of the display device to cover the edge of the display panel, it is avoided to spoil the full plane design of the display device at the display panel by the case or the frame. Further, similar to the periphery of the first polarizer which is surrounded and protected by the frame, the periphery of the cover coplanar with the first polarizer is also surrounded and protected by the frame, so as to decrease a chance of damaging the same due to the external force. Moreover, since the display device of the invention omits the conventional cover glass, a whole thickness of the display device is decreased, so as to achieve a thinning effect.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A display device, comprising:
    a back cover;
    a frame, disposed on the back cover, and having an opening;
    a display panel, disposed in the opening, and having a first surface and a second surface opposite to each other;
    a backlight module, disposed between the back cover and the display panel, wherein the first surface faces the backlight module; and
    a first polarizer, disposed on the second surface, wherein a periphery of the first polarizer extends to an outside of the second surface and is carried by the frame, and the frame surrounds the periphery of the first polarizer, wherein the back cover and the frame are exterior parts of the display device.

2. The display device of claim 1, wherein the frame comprises a carrier portion and a buffer portion, the carrier portion carries the periphery of the first polarizer, and the buffer portion is connected to the carrier portion and surrounds the periphery of the first polarizer.

3. The display device of claim 1, wherein a material of the frame comprises an elastic material.

4. The display device of claim 1, wherein the first polarizer is adhered to the frame.

5. The display device of claim 1, wherein the display panel and the backlight module have a gap therebetween.

6. The display device of claim 1, wherein a material of the frame is different from a material of the back cover.

7. The display device of claim 1, wherein the frame and the back cover are not integrally formed.

8. The display device of claim 1, further comprising:
a light-shielding layer, disposed between the periphery of the first polarizer and the frame, and extending towards the display panel.

9. The display device of claim 8, wherein the light-shielding layer extends to a place between the first polarizer and the second surface of the display panel.

10. The display device of claim 1, further comprising:
a second polarizer, disposed on the first surface of the display panel, and a periphery of the second polarizer extending to an inner edge of the opening.

11. The display device of claim 1, further comprising:
a touch layer, disposed between the first polarizer and the display panel.

12. The display device of claim 11, wherein a periphery of the touch layer extends to the outside of the second surface and is carried by the frame, and the frame surrounds the periphery of the touch layer.

13. The display device of claim 12, wherein the periphery of the touch layer is adhered to the frame.

14. The display device of claim 1, wherein the first polarizer has a third surface and a fourth surface opposite to each other, the third surface faces the display panel and the frame, and the frame completely exposes the fourth surface.

15. The display device of claim 1, further comprising:
a cover, wherein the first polarizer covers a part of the second surface, the cover covers another part of the second surface, a periphery of the cover extends to the outside of the second surface and is carried by the frame, and the frame surrounds the periphery of the cover.

16. The display device of claim 15, wherein the first polarizer is connected to the cover.

17. The display device of claim 15, wherein the first polarizer and the cover are coplanar.

18. The display device of claim 1, further comprising:
a supporting member, disposed in the opening and located between the display panel and the frame, wherein a part of the first polarizer covers the second surface of the display panel, and another part of the first polarizer is located outside the second surface and is supported by the supporting member.

19. The display device of claim 1, wherein the frame is adhered to the back cover.

* * * * *